United States Patent
Kacines

(10) Patent No.: US 6,619,700 B2
(45) Date of Patent: Sep. 16, 2003

(54) BANJO CONNECTOR FOR COUPLING A BRAKE HOSE TO A BRAKE CALIPER

(75) Inventor: Steven C. Kacines, Fort Wayne, IN (US)

(73) Assignee: C.F. Gomma USA, Inc., Columbia City, IN (US)

( * ) Notice: Subject to any disclaimer, the term of this patent is extended or adjusted under 35 U.S.C. 154(b) by 0 days.

(21) Appl. No.: 09/990,835

(22) Filed: Nov. 14, 2001

(65) Prior Publication Data
US 2003/0090107 A1 May 15, 2003

(51) Int. Cl.[7] .............................. F16L 33/00; F16L 47/00
(52) U.S. Cl. ....................... 285/256; 285/190; 285/259
(58) Field of Search ................................. 285/256, 190, 285/382, 259, 331

(56) References Cited

U.S. PATENT DOCUMENTS

| | | | | |
|---|---|---|---|---|
| 2,090,251 A | * | 8/1937 | Cowles | 285/148.19 |
| 2,133,313 A | * | 10/1938 | Weatherhead, Jr. | 285/256 |
| 2,517,669 A | * | 8/1950 | Hufferd et al. | 285/256 |
| 2,808,643 A | | 10/1957 | Weatherhead, Jr. | |
| 3,525,542 A | | 8/1970 | Belart et al. | |
| 3,749,427 A | * | 7/1973 | Brand | 285/382.2 |
| 4,626,006 A | | 12/1986 | Noguchi et al. | |
| 4,854,030 A | | 8/1989 | Nishikawa et al. | |
| 4,927,190 A | | 5/1990 | Nishikawa et al. | |
| 6,447,020 B1 | * | 9/2002 | Kacines et al. | 285/256 |
| 6,453,539 B1 | * | 9/2002 | Brugmann, Jr. | 29/516 |
| 2001/0028170 A1 | * | 10/2001 | Sausner et al. | 285/256 |

FOREIGN PATENT DOCUMENTS

| | | |
|---|---|---|
| DE | 3520800 A1 * | 12/1986 |
| FR | 1 014 789 | 8/1952 |
| FR | 85 633 | 8/1965 |
| FR | 1 423 846 | 11/1965 |

\* cited by examiner

Primary Examiner—Lynne H. Browne
Assistant Examiner—Aaron Dunwoody
(74) Attorney, Agent, or Firm—Taylor & Aust, P.C.

(57) ABSTRACT

A brake hose assembly includes a crimp banjo connector and a brake hose. The crimp banjo connector has a banjo fitting which includes a base and an annular projection extending from the base, the banjo fitting being composed of a first material having a first modulus of elasticity. An eyelet is positioned within the annular projection, the eyelet being connected to and extending from the base. The eyelet is composed of a second material having a second modulus of elasticity, the second modulus of elasticity of the second material being greater than the first modulus of elasticity of the first material. The brake hose is received within the annular projection of the banjo fitting and mounted upon the eyelet.

21 Claims, 5 Drawing Sheets

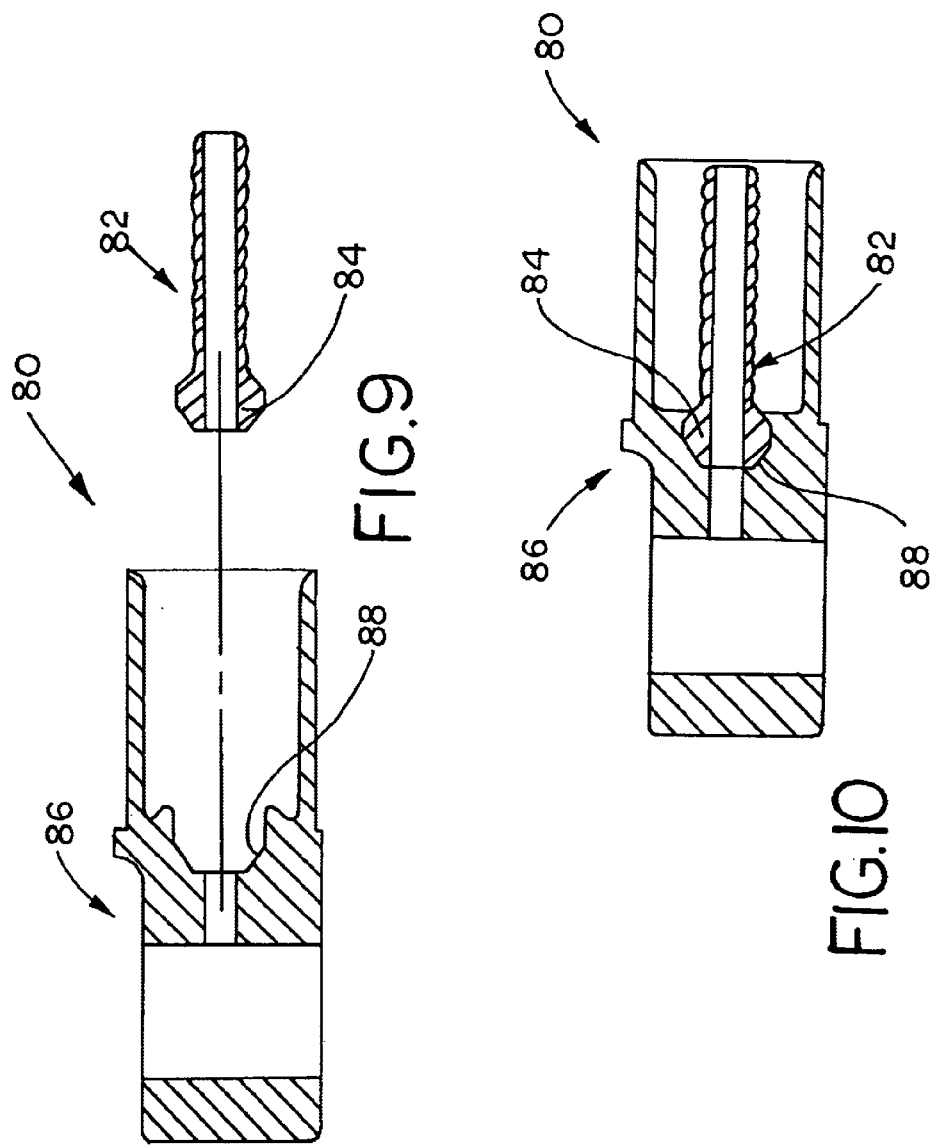

BANJO CONNECTOR FOR COUPLING A BRAKE HOSE TO A BRAKE CALIPER

BACKGROUND OF THE INVENTION

1. Field of the Invention

The present invention relates to a connector for coupling a brake hose assembly to a brake caliper, and, more particularly, to a crimp banjo connector therefore.

2. Description of the Related Art

Common configurations of modern brake hose assemblies typically use a brass banjo fitting for facilitating coupling of a brake hose to the brake caliper (FIG. 1). While this produces a sound and robust joint, it produces certain manufacturing difficulties. During the processing and crimping of the hose to the banjo fitting, a mandrel must be inserted the entire length of the part to support the brass component during crimping. If the brass stem of the banjo is not supported during crimping, it tends to collapse and thus cause the resulting component to be constricted. The use of a mandrel to support this brass component is commonplace within the industry. However, the use of such a mandrel is time consuming and does not immediately lend itself to high-volume, automated processing.

What is needed in the art is a crimp banjo connector which does not require the use of such a mandrel.

SUMMARY OF THE INVENTION

The present invention provides a crimp banjo connector with an eyelet that is strong enough to withstand the forces of crimping and thereby allow the hose assembly to be processed without the need of a mandrel to support the fitting.

The invention comprises, in one form thereof, a brake hose assembly which includes a crimp banjo connector and a brake hose. The crimp banjo connector has a banjo fitting which includes a base and an annular projection extending from the base, the banjo fitting being composed of a first material having a first modulus of elasticity. An eyelet is positioned within the annular projection, the eyelet being connected to and extending from the base. The eyelet is composed of a second material having a second modulus of elasticity, the second modulus of elasticity of the second material being greater than the first modulus of elasticity of the first material. The brake hose is received within the annular projection of the banjo fitting and mounted upon the eyelet.

An advantage of the present invention is that it eliminates the requirements of crimping a brass component over a mandrel and reduces the assembly time of the final product.

Another advantage is that the component portions of the crimp banjo connector of the present invention together offer a reduction in the machining complexity and an increased potential for automation.

Yet another advantage is that the orbital staking process for encapsulating the eyelet within the fitting requires far less force to be introduced along the axis of the component than does traditional staking and, thus, makes the staking of the eyelet into the brass fitting component easier to accomplish.

An even yet further advantage of the present invention is that such crimp connector technology can be extended to situations in which types of crimp connectors other than crimp banjo connectors are employed.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIGS. 9 and 10 are cross-sectional views illustrating a method of assembling another embodiment of a mandrel-less crimp banjo connector of the present invention.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
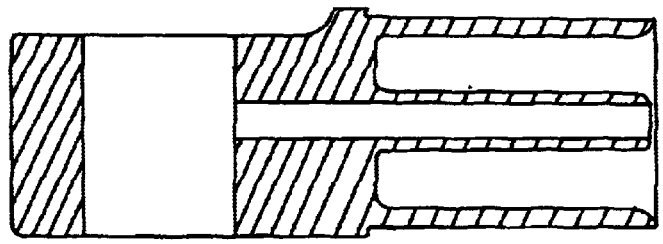
FIG. 1 is a cross-sectional view of a prior art version of a one-piece brass banjo.
Figure 2:
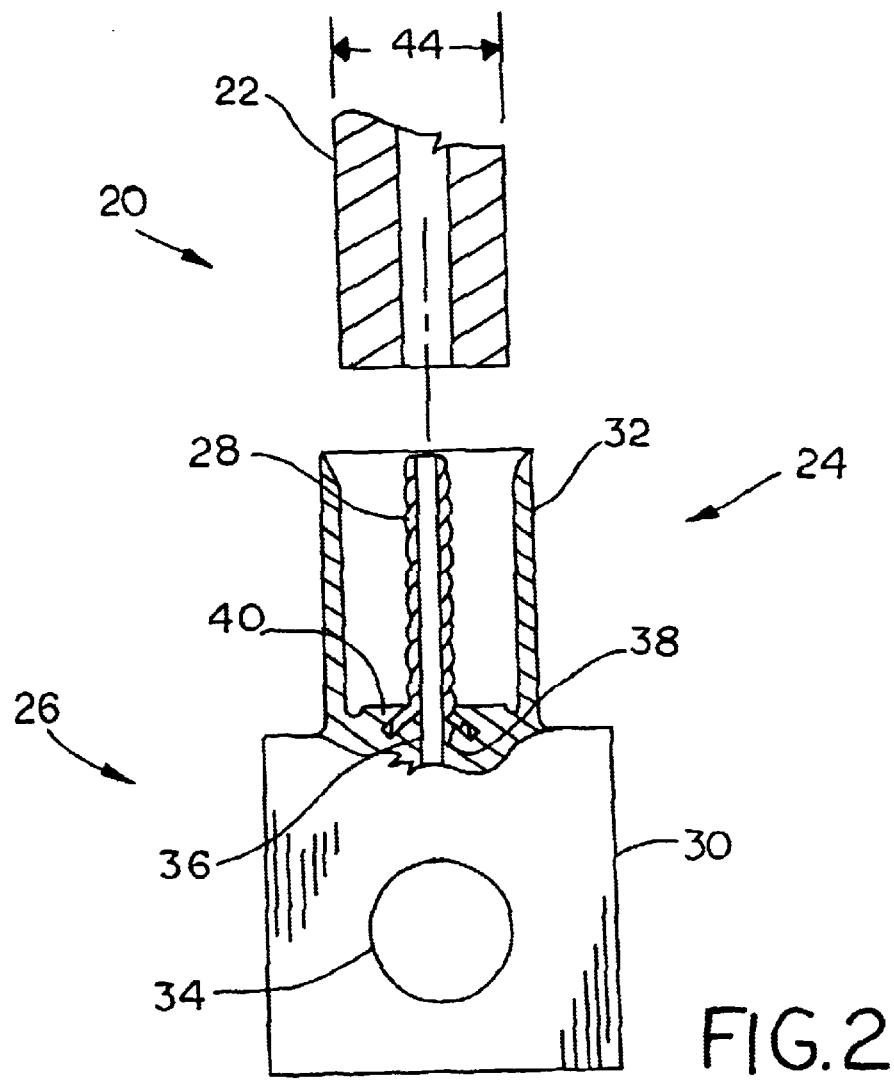
FIG. 2 is a partial cut-away, exploded view of a brake hose assembly of a present embodiment.

Referring now to the drawings, and more particularly to FIG. 2, there is shown an exploded, partially cut-away view of a brake hose assembly 20 which includes a brake hose 22 and a mandrel-less crimp banjo connector 24. Banjo connector 24 is formed of a banjo fitting 26 and an eyelet 28.

Banjo fitting 26 is of a one-piece construction and is preferably formed of brass. Banjo fitting 26 has a main portion 30 and a crimp shank 32.

Figure 3:
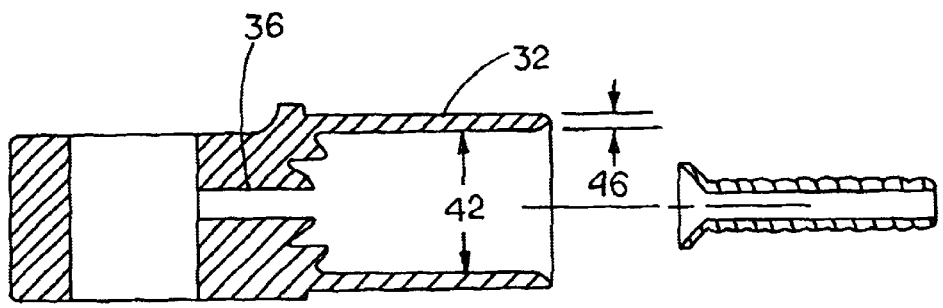
FIGS. 3–5 are a series of cross-sectional views which together illustrate a method of assembling a mandrel-less crimp banjo connector of the present invention.

Main portion 30 is designed to receive eyelet 28 permanently therein and to be placed in fluid communication with brake hose 22. Main portion 30 also facilitates the coupling of a brake caliper (not shown) to brake hose 22. Main portion 30 thus is structured to receive the brake caliper and brake hose 22, via eyelet 28, and permit fluid communication therebetween. Main portion 30 includes a caliper through-hole 34 for receiving the brake caliper therein and brake-line through-hole 36 transverse thereto (best seen in, e.g., FIGS. 3–5).

Further, main portion 30 has a seat 38 upon which eyelet 28 is positioned and a staking portion 40 surrounding seat 38 for staking of eyelet 28 thereto.

Crimp shank 32 is structured to receive and retain brake hose 22. Crimp shank 32 has an inner diameter 42 which is substantially equal to outer diameter 44 of brake hose 22, thereby permitting brake hose 22 to be fittingly received within crimp shank 32. Thickness 46 of crimp shank 32 is chosen so as to be readily crimped upon brake hose 22 yet to have sufficient strength to retain brake hose 22 within crimp shank 32 upon crimping thereof.

Eyelet 28 is made of a material which has a larger modulus of elasticity than the material used in making banjo fitting 26. Specifically, the modulus of elasticity of the material used in making eyelet 28 must sufficiently exceed that of the material used in making banjo fitting 26 so that eyelet 28 is strong enough to withstand the forces of crimping and thereby allow brake hose assembly 20 to be processed without the need of a mandrel to support eyelet 28. Eyelet 28 is preferably made of a deep-drawn mild steel.

Eyelet 28 includes a main eyelet portion 48 and a large-diameter end portion 50. Main eyelet portion 48 has a main diameter 54, while large-diameter end portion 50 has an end diameter 52. End diameter 52 exceeds main diameter 54 so as to provide a sufficient enough surface area upon large-diameter end portion 50 for staking of eyelet 28 within seat 38. In this particular embodiment, large-diameter end portion 50 is a flared portion with a flare angle 56. Flare angle 56 is chosen so as to allow large-diameter end portion 50 to mate with corresponding seat 38. In this embodiment, flare angle 56 is approximately 45°.

Main eyelet portion 48 has an outer surface 58. Outer surface 58 preferably has at least one groove 60 formed therein and/or at least one ridge 62 formed thereon, each groove 60 and ridge 62 aiding in the retention of brake hose 22 on eyelet 28. However, it is understood that outer surface 58 may function adequately without any such groove 60 therein.

Figure 7:
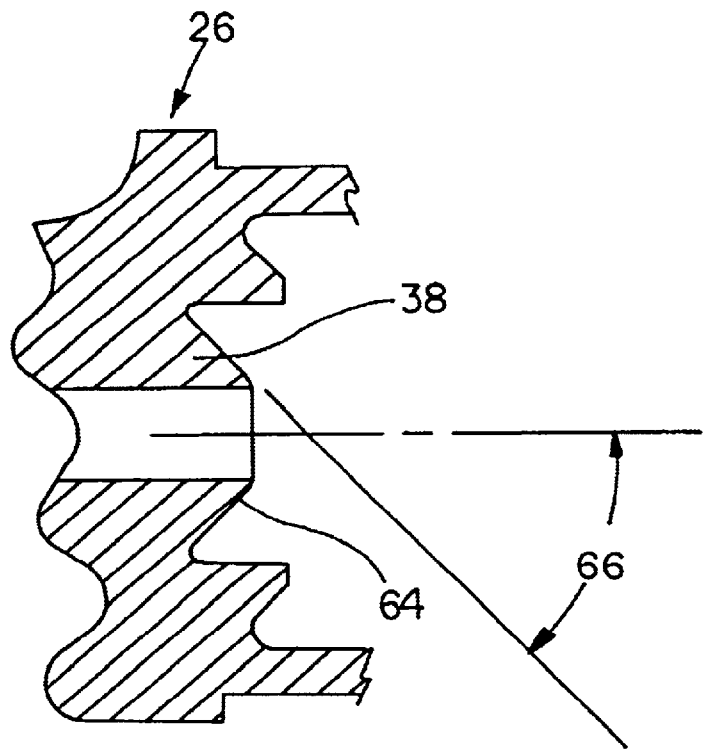
FIG. 7 is a partial cross-sectional view of one embodiment of a seat of a banjo fitting of the present invention.
Figure 8:
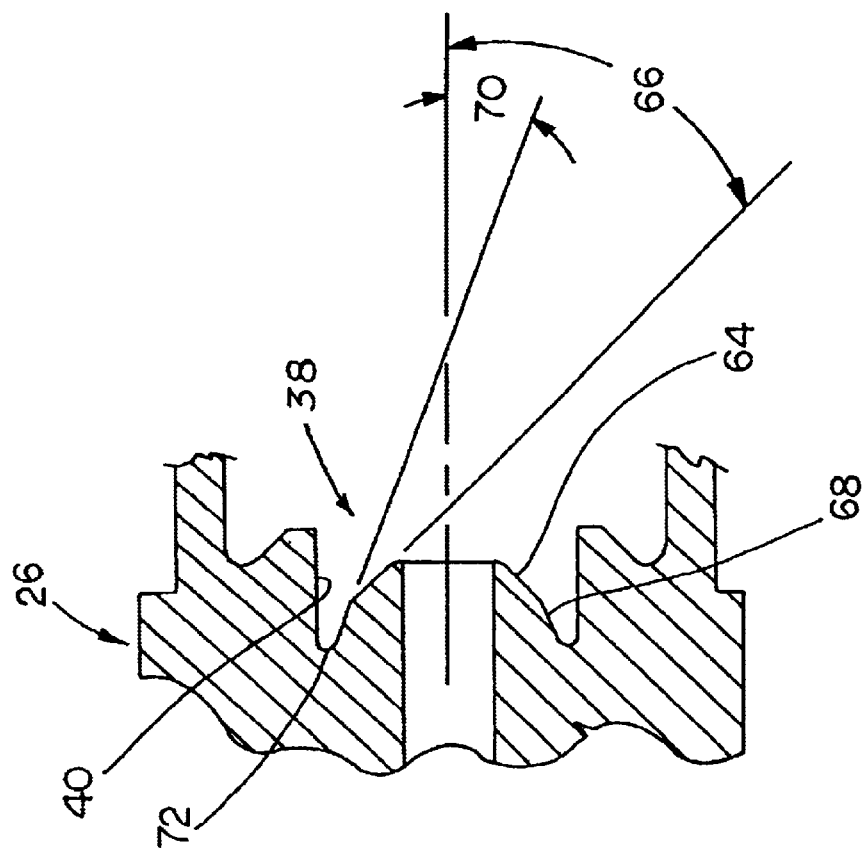
FIG. 8 is a partial cross-sectional view of another embodiment of a seat of a banjo fitting of the present invention.

Eyelet 28 with flared, large-diameter and portion 50 may be matingly fitted upon multiple embodiments of the seat for banjo fitting 26. In one embodiment, seat 38 (FIGS. 2, 7) has essentially a single seat surface 64, thereby promoting easy and stable mounting of eyelet 28 upon seat 38. Seat surface 64 has a seat angle 66 of approximately 45°. In a further embodiment, seat 38 includes an additional second seat surface 68 located between seat surface 64 and staking portion 40. Second seat surface 68 (FIG. 8) has a seat angle 70 which is less than that of seat angle 66 so as to effectively form a seat groove 72 into which flared, large-diameter end portion 50 could be partially press fit thereinto. Second seat angle 70 is preferably about 20–25°. Alternatively, seat groove 72 could be produced by having seat surface 64 to be a single curved surface (not shown).

In yet another embodiment, banjo connector 80 (FIGS. 9 and 10) includes an eyelet 82 having a stem end 84 and a banjo fitting 86 having a stem seat 88. Stem end 84 is either a cold-headed or machined stem, and stem seat 88 is configured to receive stem end 84. Except for eyelet 82 and stem seat 88, the elements of this embodiment are substantially the same as those presented in the embodiment shown in, e.g., FIG. 2.

Figure 4:
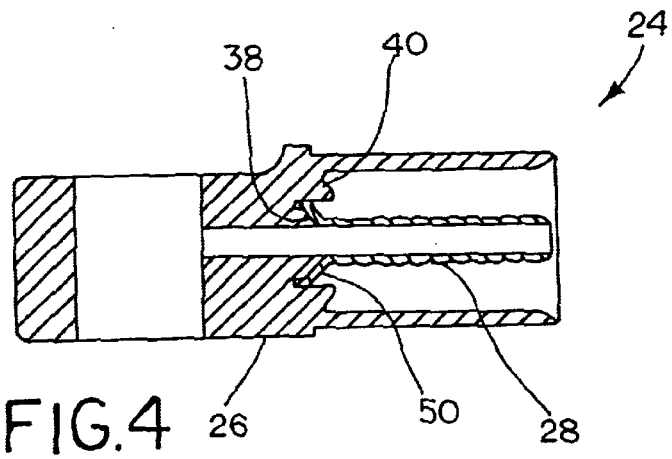
Figure 5:
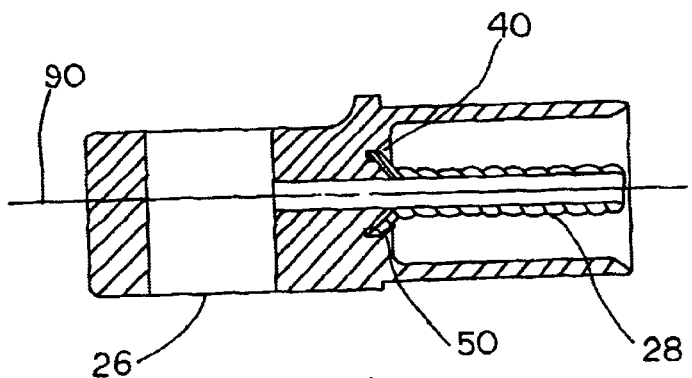
Figure 6:
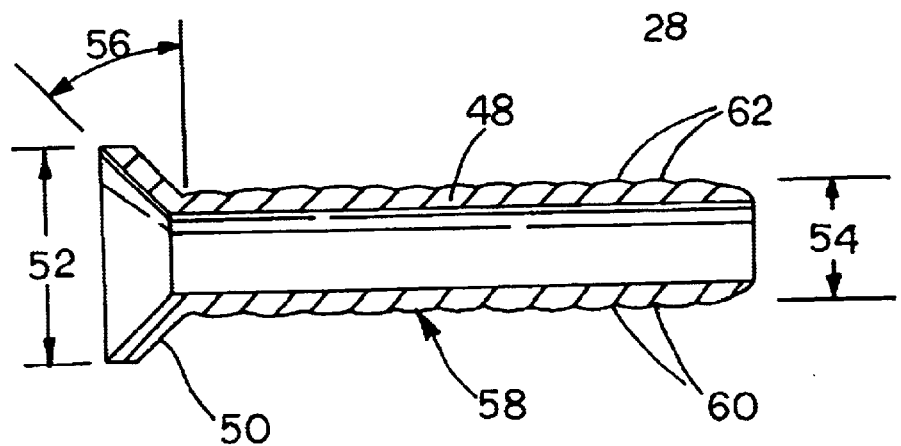
FIG. 6 is a cross-sectional view of an embodiment of an eyelet of the present invention.

A method of forming mandrel-less crimp banjo connector 24 involves forming a connection between banjo fitting 26 and eyelet 28. Eyelet 28, which is preferably formed by a deep draw procedure, is pressed into seat 38 within banjo fitting 26, large-diameter end portion 50 of eyelet 28 thereby mating with seat 38 (FIG. 4). An orbital staking step, the result of which is shown in FIG. 5, performed upon staking portion 40 encapsulates large-diameter end portion 50 of eyelet 28 within banjo fitting 26. The orbital staking step requires far less force be introduced along axis 90 of mandrel-less crimp banjo connector 24 than would a traditional staking step, thereby easing the staking of eyelet 28 into banjo fitting 26.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A brake hose assembly, comprising:
a crimp connector, comprising:
a main fitting including a base and an annular projection extending from said base, said main fitting being composed of a first material having a first modulus of elasticity, said base having therewithin a seat and a staking portion surrounding said seat, said seat includes at least one angled surface, said seat has one angled surface having a seat angle, said outwardly flared portion having a flare angle, said seat angle being substantially equal to said flare angle; and
an eyelet positioned within said annular projection, said eyelet connected to and extending from said base, said eyelet being composed of a second material having a second modulus of elasticity, said second modulus of elasticity of said second material being greater than said first modulus of elasticity of said first material, said eyelet having a main portion and a large-diameter end portion, said large-diameter end portion being greater in diameter than said main portion, said large-diameter end portion of said eyelet being matingly fitted into said seat, said staking portion being staked around and thereby encapsulating said large-diameter end portion of said eyelet, said large-diameter end portion is an outwardly flared portion of said eyelet; and
a brake hose received within said annular projection of said main fitting and mounted upon said eyelet.

2. The brake hose assembly of claim 1, wherein said first modulus of elasticity and said second modulus of elasticity are chosen so as to permit deformation of at least one of said annular projection and said staking portion without any substantial deformation of said eyelet.

3. The brake hose assembly of claim 1, wherein said first material is a mild steel and said second material is brass.

4. The brake hose assembly of claim 1, wherein said large-diameter end portion is a stem head which is one of cold headed and machined.

5. The brake hose assembly of claim 1, wherein said crimp connector is a crimp banjo connector.

6. A brake hose assembly, comprising:
a crimp connector, comprising:
a main fitting including a base and an annular projection extending from said base, said main fitting being composed of a first material having a first modulus of elasticity, said base having therewithin a seat and a staking portion surrounding said seat, said seat includes at least one angled surface, said staking portion has a staking wall facing said seat, said seat including a first angled surface having a first seat angle and a second angled surface having a second seat angle, said second angled surface being adjacent said staking wall, said second angled surface and said staking wall together forming a groove, a section of said outwardly flared portion of said eyelet being press fit into said groove; and
an eyelet positioned within said annular projection, said eyelet connected to and extending from said base, said eyelet being composed of a second material having a second modulus of elasticity, said second modulus of elasticity of said second material being greater than said first modulus of elasticity of said first material, said eyelet having a main portion and a large-diameter end portion, said large-diameter end portion being greater in diameter than said main portion, said large-diameter end portion of said eyelet being matingly fitted into said seat, said staking portion being staked around and thereby encapsulating said large-diameter end portion of said eyelet, said large-diameter end portion is an outwardly flared portion of said eyelet; and a brake hose received within said annular projection of said main fitting and mounted upon said eyelet.

7. A crimp connector, comprising:

a main fitting portion having a base and an annular projection extending from said base, said main fitting being composed of a first material having a first modulus of elasticity, said base has therewithin a seat and a staking portion surrounding said seat, said seat including at least one angled surface, said seat has one angled surface having a seat angle, said outwardly flared portion having a flare angle, said seat angle being substantially equal to said flare angle; and an eyelet positioned within said annular projection, said eyelet connected to and extending from said base, said eyelet being composed of a second material having a second modulus of elasticity, said second modulus of elasticity of said second material being greater than said first modulus of elasticity of said first material, said eyelet has a main portion and a large-diameter end portion, said large-diameter end portion being greater in diameter than said main portion, said large-diameter end portion is an outwardly flared portion of said eyelet.

8. The crimp connector of claim 7, wherein said first material is a mild steel and said second material is brass.

9. The crimp connector of claim 7, wherein said base has therewithin a seat and a staking portion surrounding said seat.

10. The crimp connector of claim 9, wherein said eyelet has a main portion and a large-diameter end portion, said large-diameter end portion of said eyelet being matingly fitted into said seat, said staking portion being staked around and thereby encapsulating said large-diameter end portion of said eyelet.

11. The crimp connector of claim 10, wherein said first modulus of elasticity and said second modulus of elasticity being chosen so as to permit deformation of at least one of said annular projection and said staking portion without any substantial deformation of said eyelet.

12. The crimp connector of claim 7, wherein said main portion of said eyelet has at least one of a retention groove formed therein and a retention projection formed thereon.

13. The crimp connector of claim 7, wherein said large-diameter end portion is a stem head which is one of cold headed and machined.

14. A crimp connector, comprising:

a main fitting portion having a base and an annular projection extending from said base, said main fitting being composed of a first material having a first modulus of elasticity, said base has therewithin a seat and a staking portion surrounding said seat, said seat including at least one angled surface, said staking portion has a staking wall facing said seat, said seat including a first angled surface having a first seat angle and a second angled surface having a second seat angle, said second angled surface being adjacent said staking wall, said second angled surface and said staking wall together forming a groove, a section of said outwardly flared portion of said eyelet being press fit into said groove; and an eyelet positioned within said annular projection, said eyelet connected to and extending from said base, said eyelet being composed of a second material having a second modulus of elasticity, said second modulus of elasticity of said second material being greater than said first modulus of elasticity of said first material, said eyelet has a main portion and a large-diameter end portion, said large-diameter end portion being greater in diameter than said main portion, said large-diameter end portion is an outwardly flared portion of said eyelet.

15. A method of forming a crimp connector, said method comprising the steps of:

providing an eyelet having a main portion and a large-diameter end portion, said large-diameter end portion being greater in diameter than said main portion, said eyelet being composed of a first metallic material having a first modulus of elasticity, said eyelet having a main portion and a large-diameter end portion, said large-diameter end portion being greater in diameter than said main portion, said large-diameter end portion being an outwardly flared portion of said eyelet;

providing a crimp fitting including a base and an annular projection extending from said base, said base having therewithin a seat and a staking portion surrounding said seat, said crimp fitting being composed of a second material having a second modulus of elasticity, said base having therewithin a seat and a staking portion surrounding said seat, said seat including at least one angled surface having a seat angle, said outwardly flared portion having a flare angle, said seat angle being substantially equal to said flare angle;

positioning said large-diameter end portion upon said seat; and staking said staking portion upon and thereby encapsulating said large-diameter end portion, said first modulus of elasticity of said first metallic material sufficiently exceeding said second modulus of elasticity of said second metallic material so as to permit said staking portion of said crimp fitting to be deformed during said staking step without any substantial deformation of said eyelet.

16. The method of claim 15, wherein said first material is a mild steel.

17. The method of claim 16, wherein said step of providing said eyelet further includes deep drawing said mild steel to form said eyelet.

18. The method of claim 15, wherein said step of providing said eyelet further includes forming at least one of a retention groove in and a retention projection on said main portion of said eyelet.

19. The method of claim 15, wherein said second material is brass.

20. The method of claim 15, wherein said step of positioning said large-diameter end portion further includes matingly fitting said large-diameter end portion of said eyelet into said seat.

21. The method of claim 20, wherein said staking portion and said seat form a groove at the junction thereof, said step of positioning comprising press fitting at least a section of said large-diameter end portion into said groove.

* * * * *